(12) United States Patent
Zhao et al.

(10) Patent No.: US 8,049,439 B2
(45) Date of Patent: Nov. 1, 2011

(54) LED DRIVER WITH DYNAMIC HEADROOM CONTROL

(75) Inventors: Bin Zhao, Irvine, CA (US); Jack W. Cornish, Foothill Ranch, CA (US); Brian B. Horng, Irvine, CA (US); Victor K. Lee, Irvine, CA (US); Andrew M. Kameya, Irvine, CA (US)

(73) Assignee: Freescale Semiconductor, Inc., Austin, TX (US)

( * ) Notice: Subject to any disclaimer, the term of this patent is extended or adjusted under 35 U.S.C. 154(b) by 377 days.

(21) Appl. No.: 12/363,607

(22) Filed: Jan. 30, 2009

(65) Prior Publication Data
US 2010/0194308 A1 Aug. 5, 2010

(51) Int. Cl.
*H05B 37/02* (2006.01)
(52) U.S. Cl. ............... 315/297; 315/307; 315/308
(58) Field of Classification Search ............. 315/297, 315/307, 224, 308, 192
See application file for complete search history.

(56) References Cited

U.S. PATENT DOCUMENTS

| | | | |
|---|---|---|---|
| 3,973,197 A | 8/1976 | Meyer | |
| 4,162,444 A | 7/1979 | Rodgers | |
| 4,615,029 A | 9/1986 | Hu et al. | |
| 4,649,432 A | 3/1987 | Watanabe et al. | |
| 4,686,640 A | 8/1987 | Simison | |
| 5,025,176 A | 6/1991 | Takeno | |
| 5,038,055 A | 8/1991 | Kinoshita | |
| 5,455,868 A | 10/1995 | Sergent et al. | |
| 5,508,909 A | 4/1996 | Maxwell et al. | |
| 5,635,864 A | 6/1997 | Jones | |
| 5,723,950 A | 3/1998 | Wei et al. | |
| 6,002,356 A | 12/1999 | Cooper | |
| 6,281,822 B1 | 8/2001 | Park | |
| 6,373,423 B1 | 4/2002 | Knudsen | |
| 6,636,104 B2 | 10/2003 | Henry | |
| 6,822,403 B2 | 11/2004 | Horiuchi et al. | |
| 6,864,641 B2 | 3/2005 | Dygert | |
| 6,943,500 B2 | 9/2005 | LeChevalier | |
| 7,262,724 B2 | 8/2007 | Hughes et al. | |

(Continued)

FOREIGN PATENT DOCUMENTS

JP 2003332624 A 11/2003

(Continued)

OTHER PUBLICATIONS

PCT Application No. PCT/US2010/028289; Search Report and Written Opinion dated Dec. 15, 2010.

(Continued)

*Primary Examiner* — Daniel D Chang

(57) ABSTRACT

A voltage source provides an output voltage to drive a plurality of light emitting diode (LED) strings. A LED driver adjusts the level of the output voltage so as to maintain the lowest tail voltage of the LED strings at or near a predetermined threshold voltage so as provide sufficient headroom voltages for current regulators for the LED strings. The LED driver operates in an operational mode and a calibration mode, which can be implemented in parallel with, or part of, the operational mode. During the calibration mode, the LED driver determines, for each LED string, a code value representative of the level of the output voltage necessary to maintain the tail voltage of the corresponding LED string at or near the predetermined threshold voltage. In the operational mode, the code values from the calibration mode are used to control the voltage source to provide an appropriate level for the output voltage.

20 Claims, 8 Drawing Sheets

U.S. PATENT DOCUMENTS

| | | | |
|---|---|---|---|
| 7,307,614 | B2 | 12/2007 | Vinn |
| 7,315,095 | B2 | 1/2008 | Kagemoto et al. |
| 7,391,280 | B2 | 6/2008 | Hsu |
| 7,436,378 | B2 | 10/2008 | Ito et al. |
| 7,459,959 | B2 | 12/2008 | Rader et al. |
| 7,511,545 | B1 | 3/2009 | Kesler |
| 7,696,915 | B2 | 4/2010 | Chmelar et al. |
| 7,777,704 | B2 | 8/2010 | S et al. |
| 7,973,495 | B2 | 7/2011 | Ion et al. |
| 2004/0208011 | A1 | 10/2004 | Horiuchi et al. |
| 2004/0233144 | A1 | 11/2004 | Rader et al. |
| 2006/0164162 | A1 | 7/2006 | Dauphinee et al. |
| 2006/0186830 | A1 | 8/2006 | Shami et al. |
| 2006/0261895 | A1 | 11/2006 | Kocaman et al. |
| 2007/0080911 | A1 | 4/2007 | Liu et al. |
| 2007/0253330 | A1 | 11/2007 | Tochio et al. |
| 2008/0054815 | A1 | 3/2008 | Kotikalapoodi et al. |
| 2008/0297067 | A1 | 12/2008 | Wang et al. |
| 2009/0108775 | A1* | 4/2009 | Sandner et al. ............... 315/297 |
| 2009/0128045 | A1 | 5/2009 | Szczeszynski et al. |
| 2009/0187925 | A1 | 7/2009 | Hu et al. |
| 2009/0230874 | A1 | 9/2009 | Zhao et al. |
| 2009/0230891 | A1 | 9/2009 | Zhao et al. |
| 2009/0273288 | A1 | 11/2009 | Zhao et al. |
| 2009/0315481 | A1 | 12/2009 | Zhao |
| 2010/0013395 | A1 | 1/2010 | Archibald et al. |
| 2010/0013412 | A1 | 1/2010 | Archibald et al. |
| 2010/0026203 | A1 | 2/2010 | Zhao et al. |
| 2010/0085295 | A1 | 4/2010 | Zhao et al. |
| 2010/0156315 | A1* | 6/2010 | Zhao et al. .................... 315/294 |

FOREIGN PATENT DOCUMENTS

| | | | |
|---|---|---|---|
| JP | 2005116199 | A | 4/2005 |
| KR | 1020070082004 | A | 8/2007 |
| WO | 2005022596 | A2 | 3/2005 |

OTHER PUBLICATIONS

Mc Nerney, Tim, "constant-current power supply for Luxeon 5W LED with low-voltage warning and shut-off Software Documentation, as shipped to Mali in first 45 prototypes," Nov. 2004, www.designthatmatters.org/ke/pubs/kled-doc.txt, 5 pages.

Maxim: "Application Note 810, Understanding Flash ADCs," Oct. 2, 2001, 8 pages.

National Semiconductor Data Sheet: "LM3432/LM3432B 6-Channel Current Regulator for LED Backlight Application," May 22, 2008, pp. 1-18.

U.S. Appl. No. 12/537,443, filed Aug. 7, 2009, entitled Pulse Width Modulation Frequency Conversion.

U.S. Appl. No. 12/703,239, filed Feb. 10, 2010, entitled "Pulse Width Modulation With Effective High Duty Resolution".

U.S. Appl. No. 12/537,692, filed Aug. 7, 2009, entitled "Phase-Shifted Pulse Width Modulation Signal Generation".

U.S. Appl. No. 12/625,818, filed Nov. 25, 2009, entitled "Synchronized Phase-Shifted Pulse Width Modulation Signal Generation".

U.S. Appl. No. 12/703,249, filed Feb. 10, 2010, entitled "Duty Transition Control in Pulse Width Modulation Signaling".

Luke Huiyong Chung, Electronic Products: "Driver ICs for LED BLUs," May 1, 2008, 3 pages.

Akira Takahashi, Electronic Products: "Methods and features of LED drivers," Mar. 2008, 3 pages.

U.S. Appl. No. 12/340,985, filed Dec. 22, 2008, entitled "LED Driver With Feedback Calibration".

U.S. Appl. No. 12/326,963, filed Dec. 3, 2008, entitled "LED Driver With Precharge and Track/Hold".

U.S. Appl. No. 12/367,672, filed Feb. 9, 2009, entitled "Configuration for Dynamic Power Control in LED Displays".

U.S. Appl. No. 12/424,326, filed Apr. 15, 2009, entitled "Peak Detection With Digital Conversion".

U.S. Appl. No. 12/504,841, filed Jul. 17, 2009, entitled "Analog-To-Digital Converter With Non-Uniform Accuracy".

U.S. Appl. No. 12/690,972, filed Jan. 21, 2010, entitled "Serial Cascade of Minimum Tail Voltages of Subsets of LED Strings for Dynamic Power Contrl in Led Displays".

Texas Instruments Publication, "Interleaved Dual PWM Controller with Programmable Max Duty Cycle," Sep. 2003, pp. 1-28.

International Application No. PCT/US2009/035284, Search Report and Written Opinion, Oct. 28, 2009, 11 pages.

Office Action—NFOA Feb. 4, 2010, 11 pages.

Office Action—NOA Jun. 2, 2010, 7 pages.

Office Action—NOA Jul. 9, 2010, 12 pages.

International App. No. PCT/US2009/065913, Search Report mailed Jul. 7, 2010, 4 pages.

Notice of Allowance mailed Jun. 21, 2011 for U.S. Appl. No. 12/340,985, 27 pages.

Non-Final Office Action mailed May 4, 2011 for U.S. Appl. No. 12/367,672 , 26 pages.

Non-Final Office Action mailed Apr. 19, 2011 for U.S. Appl. No. 12/363,294, 19 pages.

Notice of Allowance mailed Apr. 7, 2011 for U.S. Appl. No. 12/326,963, 20 pages.

Notice of Allowance mailed Jul. 19, 2011 for U.S. Appl. No. 12/424,326, 27 pages.

Notice of Allowance mailed Aug. 1, 2011 for U.S. Appl. No. 12/363,294,11 pages.

Ex parte Quayle mailed Jul. 20, 2011 for U.S. Appl. No. 12/363,179, 25 pages.

* cited by examiner

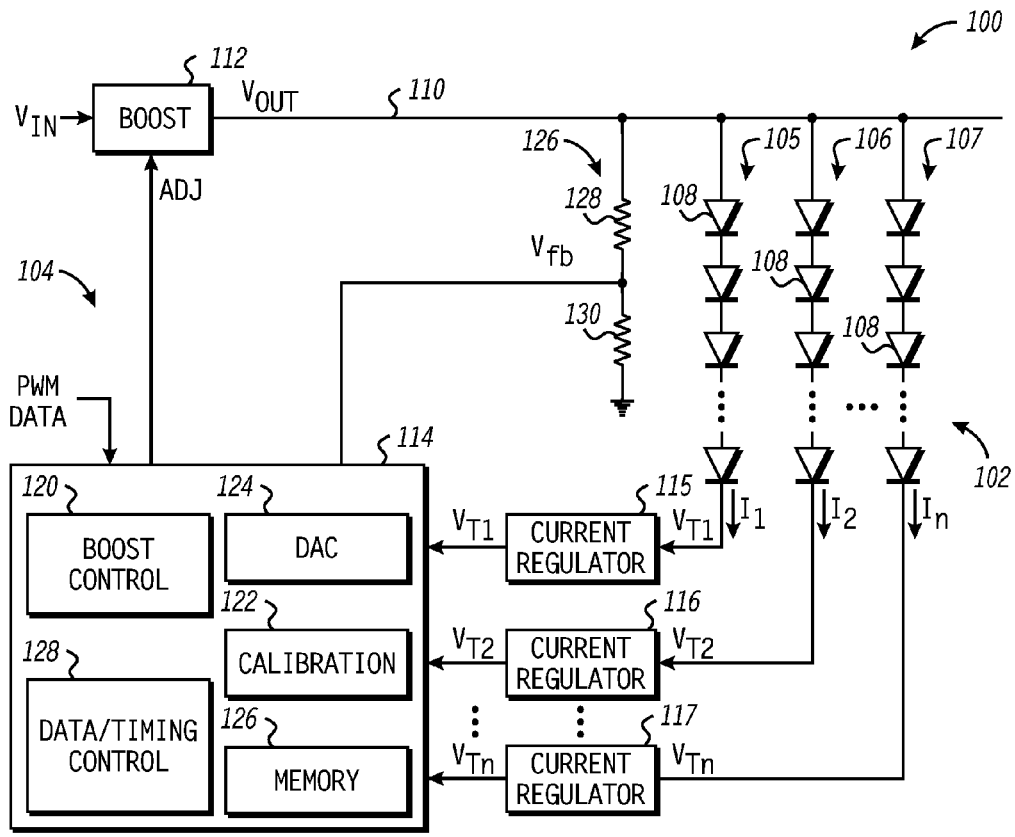
*FIG. 1*
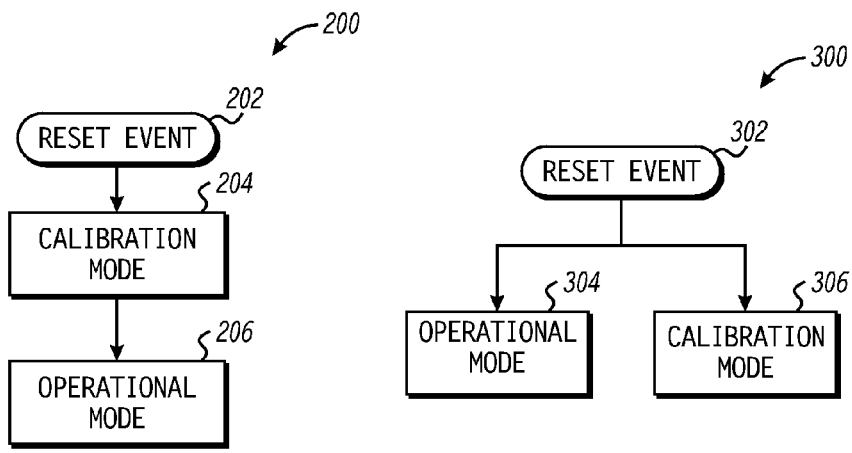
*FIG. 2*   *FIG. 3*

LED DRIVER WITH DYNAMIC HEADROOM CONTROL

FIELD OF THE DISCLOSURE

The present disclosure relates generally to light emitting diodes (LEDs) and more particularly to LED drivers.

BACKGROUND

Light emitting diodes (LEDs) often are used for backlighting sources in liquid crystal displays (LCDs) and other displays. In backlighting implementations, the LEDs are arranged in parallel "strings" driven by a shared voltage source, each LED string having a plurality of LEDs connected in series. To provide consistent light output between the LED strings, each LED string typically is driven at a regulated current that is substantially equal among all of the LED strings.

Although driven by currents of equal magnitude, there often is considerable variation in the bias voltages needed to drive each LED string due to variations in the static forward-voltage drops of individual LEDs of the LED strings resulting from process variations in the fabrication and manufacturing of the LEDs. Dynamic variations due to changes in temperature when the LEDs are enabled and disabled also can contribute to the variation in bias voltages needed to drive the LED strings with a fixed current. In view of this variation, conventional LED drivers typically provide a fixed voltage that is sufficiently higher than an expected worst-case bias drop so as to ensure proper operation of each LED string. However, as the power consumed by the LED driver and the LED strings is a product of the output voltage of the LED driver and the sum of the currents of the individual LED strings, the use of an excessively high output voltage by the LED driver unnecessarily increases power consumption by the LED driver. Accordingly, an improved technique for driving LED strings would be advantageous.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 1 is a diagram illustrating a light emitting diode (LED) system having dynamic headroom control in accordance with at least one embodiment of the present disclosure.

FIG. 2 is a flow diagram illustrating a method of operation of the LED system of FIG. 1 in accordance with at least one embodiment of the present disclosure.

FIG. 3 is a flow diagram illustrating another method of operation of the LED system of FIG. 1 in accordance with at least one embodiment of the present disclosure.

DETAILED DESCRIPTION

Figure 4:
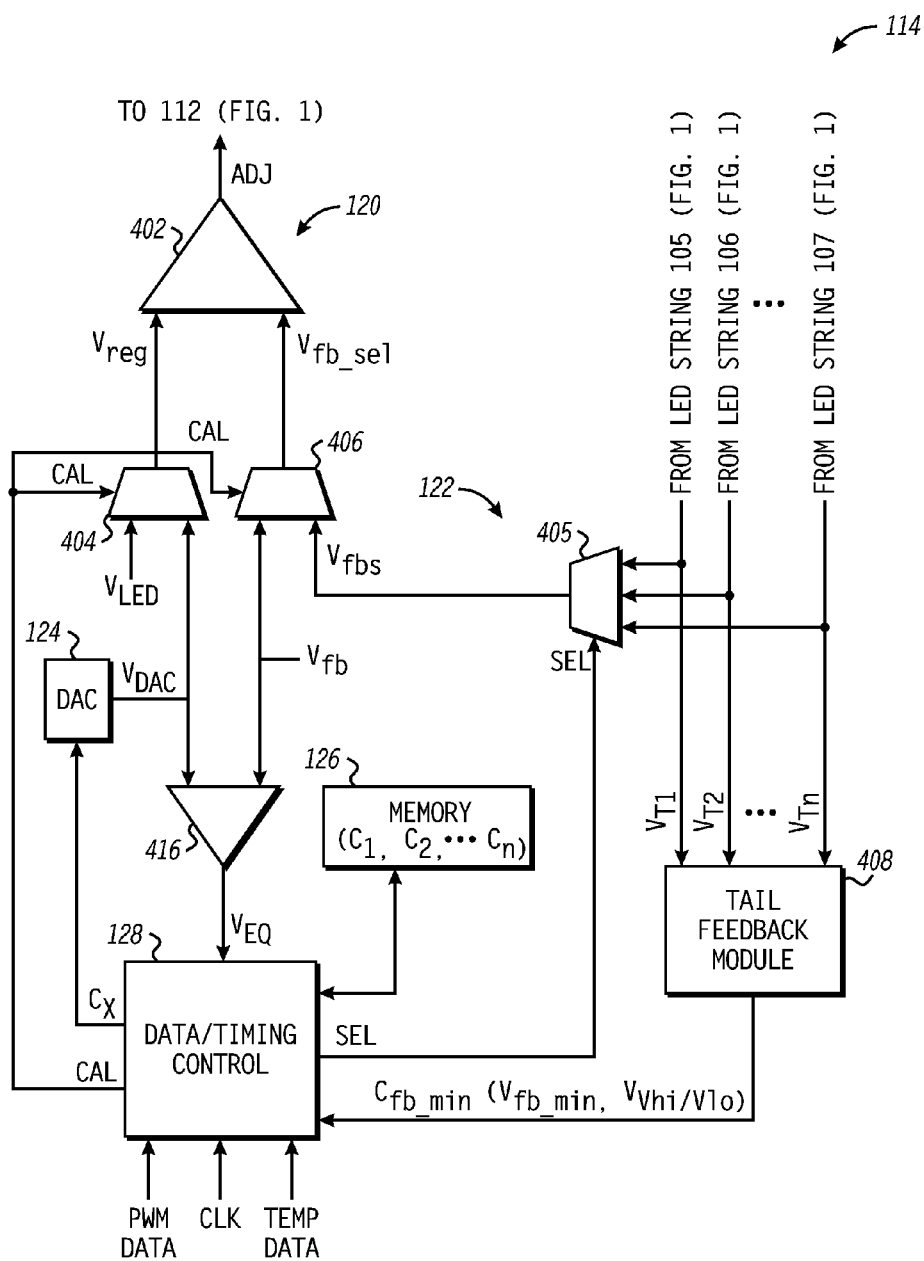
FIG. 4 is a diagram illustrating an example implementation of a feedback controller of the LED system of FIG. 1 in accordance with at least one embodiment of the present disclosure.

FIGS. 1-10 illustrate example techniques for power management in a light emitting diode (LED) system having a plurality of LED strings. A voltage source provides an output voltage to drive the LED strings. A LED driver adjusts the level of the output voltage of the voltage source so as to maintain the lowest tail voltage of the LED strings at or near a predetermined threshold voltage so as to ensure that the output voltage is sufficient to properly drive each active LED string with a regulated current in view of pulse width modulation (PWM) timing requirements without excessive power consumption. In at least one embodiment, the LED driver operates in a calibration mode and an operational mode. During the calibration mode, the LED driver determines, for each LED string, a code value representative of the level of the output voltage necessary to maintain the tail voltage of the corresponding LED string at or near the predetermined threshold voltage. After determining this code value for each LED string, the LED driver enters the operational mode whereby the code values determined during the calibration mode are used to control the voltage source so as to provide the appropriate level for the output voltage. In an alternate embodiment, the calibration mode is implemented concurrently with, or as part of, the operational mode.

The term "LED string," as used herein, refers to a grouping of one or more LEDs connected in series. The "head end" of a LED string is the end or portion of the LED string which receives the driving voltage/current and the "tail end" of the LED string is the opposite end or portion of the LED string. The term "tail voltage," as used herein, refers the voltage at the tail end of a LED string or representation thereof (e.g., a voltage-divided representation, an amplified representation, etc.). The term "equal," as used herein with respect to two values (e.g., voltages), refers to a relationship of equality between the two values in view of the characteristics and limitations of the circuitry determining the relationship between the two values. To illustrate, if a comparator has the electrical and physical characteristics such that it identifies two voltages as equal when they are within, for example, 5% of each other, then two voltages within 5% of each other are considered equal as measured or determined by the comparator.

FIG. 1 illustrates a LED system 100 having dynamic headroom control in accordance with at least one embodiment of the present disclosure. In the depicted example, the LED system 100 includes a LED panel 102, a LED driver 104, and a voltage source 112 for providing an output voltage $V_{OUT}$ to drive the LED panel 102. The LED panel 102 includes a plurality of LED strings (e.g., LED strings 105, 106, and 107). Each LED string includes one or more LEDs 108 connected in series and each LED string is driven by the output voltage $V_{OUT}$ received at the head end of the LED string via a voltage bus 110 (e.g., a conductive trace, wire, etc.). In the embodiment of FIG. 1, the voltage source 112 can be implemented as a boost converter configured to drive an output voltage $V_{OUT}$ using an input voltage $V_{IN}$. The LEDs 108 can include, for example, white LEDs, red, green, blue (RGB) LEDs, organic LEDs (OLEDs), etc.

The LED driver 104 includes a feedback controller 114 and a plurality of current regulators (e.g., current regulators 115, 116, and 117). In the example of FIG. 1, the current regulator 115 is configured to maintain the current $I_1$ flowing through the LED string 105 at or near a fixed current (e.g., 30 mA) when active. Likewise, the current regulators 116 and 117 are configured to maintain the current $I_2$ flowing through the LED string 106 when active and the current $I_n$ flowing through the LED string 107 when active, respectively, at or near the fixed current.

The feedback controller 114 includes an input to receive pulse width modulation (PWM) data representative of which of the LED strings 105-107 are to be activated and at what times during a corresponding PWM cycle (or other duration). The LED driver 104 can be configured to collectively or individually activate the LED strings 105-107 at the appropriate times in their respective PWM cycles based on the PWM data. The feedback controller 114 further includes a plurality of inputs to receive the tail voltages $V_{T1}$, $V_{T2}$, and $V_{Tn}$ of the LED strings 105, 106, and 107, respectively, and an input to receive a feedback voltage $V_{fb}$ representative of (e.g., proportional to) the level (i.e., magnitude) of the voltage $V_{OUT}$ output by the voltage source 112. In the illustrated embodiment, a voltage divider 127 implemented by resistors 128 and 130 is used to generate the feedback voltage $V_{fb}$ from the output voltage $V_{OUT}$.

The feedback regulator 114 is configured to control the voltage source 112 based on the voltage $V_{fb}$, the tail voltages $V_{T1}$, $V_{T2}$, and $V_{Tn}$, and the PWM data. Typically, a current regulator, such as current regulators 115-117, operates more optimally when the input of the current regulator is a non-zero voltage so as to accommodate the variation in the input voltage that often results from the current regulation process of the current regulator. This buffering voltage often is referred to as the "headroom" of the current regulator. As the current regulators 115-117 are connected to the tail ends of the LED strings 105-107, respectively, the tail voltages $V_{T1}$, $V_{T2}$, and $V_{Tn}$ of the LED strings 105-107 represent the amounts of headroom available at the corresponding current regulators 115-117. However, headroom in excess of that necessary for current regulation purposes results in unnecessary power consumption by the current regulator. Accordingly, as described in greater detail herein, the LED system 100 employs techniques to provide dynamic headroom control so as to maintain the minimum tail voltage of the active LED strings at or near a predetermined threshold voltage, thus maintaining the lowest headroom of the current regulators 105-107 at or near the predetermined threshold voltage. The threshold voltage can represent a determined balance between the need for sufficient headroom to permit proper current regulation by the current regulators 105-107 and the advantage of reduced power consumption by reducing the excess headroom at the current regulators 105-107.

In the illustrated example, the feedback controller 114 includes a boost control module 120, a calibration module 122, a control digital-to-analog converter (DAC) 124, a memory 126, and a data/timing controller 128. For ease of discussion, the components of the feedback controller 114 are illustrated in FIG. 1 as separate blocks based on functionality. However, as illustrated by the example implementation of FIG. 3 below, the components of the feedback controller 114 can share certain circuitry to implement their respective processes.

The data/timing control module 128 receives the PWM data and is configured to provide control signals to the other components of the LED driver 104 based on the timing and activation information represented by the PWM data. To illustrate, the data/timing control module 128 provides control signals (not shown) to the current regulators 115, 116, and 117 to control which of the LED strings 105-107 are active during corresponding portions of their respective PWM cycles. The data/timing control module 128 also provides control signals to the boost control module 120, the calibration module, the memory 126, and the control DAC 124 so as to control the operation and timing of these components. The data/timing control module 128 can be implemented as hardware, software executed by one or more processors, or a combination thereof. To illustrate, the data/timing control module 128 can be implemented as a logic-based hardware state machine.

The calibration module 122, in one embodiment, determines, for each LED string i of LED strings 105, 106, and 107, a code value $C_i$ representative of a level of the voltage $V_{OUT}$ that maintains the tail voltage $V_{Ti}$ of the LED string i (or the headroom voltage of the related LED regulator) at or near a predetermined threshold voltage $V_{LED}$ (typically around 0.5 V). After determining the code value $C_i$ for a LED string i, the calibration module 122 stores the code value $C_i$ in the memory 126 for later access during an operational mode.

The data/timing control module 128 selects a code value $C_X$ (either a previously stored code value from the memory 126 or a code value generated from an adjusted code value) and provides the code value $C_X$ to the control DAC 124, which adjusts the level of the output voltage $V_{DAC}$ based on the control value $C_X$. As described in greater detail below, the output voltage $V_{DAC}$ of the control DAC 124 can be used by the calibration module 122 in determining the code values $C_i$ during a calibration mode and by the boost control module 120 to configure a control signal ADJ based on a comparison of the output voltage $V_{OUT}$ to the feedback voltage $V_{fb}$ that is representative of the output voltage $V_{OUT}$. The voltage source 112 receives the control signal ADJ and adjusts the output voltage $V_{OUT}$ based on the magnitude of the control signal ADJ.

FIGS. 2 and 3 illustrate example methods 200 and 300 of operation of the LED system 100 of FIG. 1 in accordance with at least one embodiment of the present disclosure. As described above, there may be considerable variation between the voltage drops across each of the LED strings 105-107 due to static variations in forward-voltage biases of the LEDs 108 of each LED string and dynamic variations due to the on/off cycling of the LEDs 108. Thus, there may be significant variance in the bias voltages needed to properly operate the LED strings 105-107. However, rather than drive the output voltage $V_{OUT}$ at a fixed level that is substantially higher than what is needed for the smallest voltage drop as this is handled in conventional LED drivers, the LED driver 104 illustrated in FIG. 1 utilizes a predictive and adaptive calibration mechanism that permits the output voltage $V_{OUT}$ to be adjusted so as to reduce or minimize the power consumption of the LED driver 104 in the presence of variances in voltage drop across the LED strings 105-107.

Method 200 of FIG. 2 illustrates a sequential calibration and operation process of the LED system 100. At block 202 a reset event occurs. The reset event can include a soft reset (e.g., a timer-generated interrupt) so as to periodically refresh the predictive mechanism or a hard reset (e.g., a power-on-reset). At block 204, the feedback controller 114 enters a calibration mode whereby a calibration process is performed for each LED string i of the LED strings 105-107 to determine a code value $C_i$ for the corresponding LED string i. For this calibration process, the control value $C_X$ provided to the control DAC 124 is adjusted (e.g., incremented or decremented) so as to adjust the output voltage $V_{OUT}$ of the voltage source 112 until the tail voltage $V_{Ti}$ of the LED string i is at or near a predetermined voltage $V_{LED}$. When this condition is met, the calibration module 122 stores the code value $C_X$ currently provided to the control DAC 124 in the memory 126 as the code value $C_i$ for the LED string i. Thus, the code value $C_i$ represents a level of the output voltage $V_{OUT}$ that results in a tail voltage of the corresponding LED string i (or headroom voltage for the related current regulator) that is equal to the predetermined voltage $V_{LED}$. When a code value $C_i$ has been determined for all of the LED strings, at block 206 the feedback controller 114 enters an operational mode whereby the code values $C_i$ determined during the calibration mode are used to control the voltage source 112 during operation of the LED panel 102. An example process of generating the code values $C_i$ during calibration mode and using the code values $C_i$ during operational mode with reference to method 200 are described in greater detail below with reference to FIGS. 4-6.

Method 300 of FIG. 3 illustrates a concurrent calibration and operation process of the LED system 100. At block 302 a reset event occurs as discussed above. At block 304, the LED system 100 enters an operational mode. In parallel, at block 306 the LED system 100 enacts a calibration mode to determine a corresponding code value $C_i$ for each LED string, which then may be utilized in the concurrent operational mode as described herein. Typically the calibration mode will be enacted directly following the reset event. Further, the LED system 100 can be recalibrated by periodically reenacting the calibration mode in parallel with the operational mode. Example processes of generating the code values $C_i$ during calibration mode with reference to method 300 are described in greater detail below with reference to FIGS. 7-9.

In one embodiment, the code values $C_i$ for each LED strings are determined by analyzing the operation of each LED string separately by selecting an LED string and then sweeping through the code values $C_X$ until the appropriate code value $C_i$ for the LED string is determined. In an alternate embodiment, the LED strings are collectively analyzed by incrementally adjusting the code value $C_X$ and then analyzing all LED strings after each increment to identify which LED strings meet the predetermined condition using the current code value $C_X$.

FIG. 4 illustrates an example implementation of the feedback controller 114 of FIG. 1 in accordance with at least one embodiment of the present disclosure. In the depicted example, the boost control module 120 is implemented using an error amplifier 402. The calibration module 122 is implemented using selectors 404, 405, and 406 (e.g., multiplexers), a tail feedback module 408, and a comparator 416. The data/timing control module 128 is configured to provide a plurality of control signals based on one or more of the PWM data, timing information (e.g., from a clock signal CLK), and temperature data from a temperature sensor (not shown) that is co-located with the LED panel 102 (FIG. 1). The control signals include a signal CAL and a signal SEL. The signal CAL is used to control whether the LED driver 102 is in the calibration mode (CAL is asserted) or in the operational mode (CAL is unasserted). The signal SEL is used to select a particular LED string for calibration during the calibration mode, as described below.

The tail feedback module 408 includes a plurality of inputs to receive the tail voltages (or headroom voltages) $V_{T1}$, $V_{T2}$, and $V_{Tn}$ and an output to provide feedback signaling based on the tail voltages $V_{T1}$, $V_{T2}$, and $V_{Tn}$. The feedback signaling is used by the data/timing control module 128 to determine the state of the headroom voltages so as to permit periodic tuning of the LED system 100, such as by reenacting the calibration mode to update the code values for the LED strings 105-107 based on a comparison of the headroom voltages represented by the tail voltages of the LED strings 105-107 to one or more threshold voltages or values. In one embodiment, the tail feedback module 408 includes a minimum select module (not shown) configured to output a voltage $V_{fb\_min}$ that is the minimum of the tail voltages $V_{T1}$, $V_{T2}$, and $V_{Tn}$. Example implementations of the minimum select module are described in U.S. patent application Ser. No. 12/056,237, the entirety of which is incorporated by reference herein. For example, the minimum select module can be implemented as a plurality of semiconductor p-n junction diodes, each diode coupled in a reverse-polarity configuration between a corresponding tail voltage input and the output of the tail minimum select module such that the output of the minimum select module is always equal to the minimum tail voltage of the tail voltages $V_{T1}$, $V_{T2}$, and $V_{Tn}$ less an offset from voltage drop of the diodes (e.g., 0.5 V or 0.7 V), which can be compensated for using any of a variety of techniques. The minimum tail voltage $V_{fb\_min}$ output by the minimum select module then can be converted to a digital code $C_{fb\_min}$ using an analog-to-digital converter (ADC) of the tail feedback module 408. The data/timing control module 128 then can compare the code $C_{fb\_min}$ to one or more threshold codes (e.g., an upper threshold code and a lower threshold code) to determine whether the minimum tail voltage $V_{fb\_min}$ is above a maximum headroom threshold or below a minimum headroom threshold and reenact the calibration mode accordingly. Alternately, the tail feedback module 408 can include a single comparator (not shown) to compare the minimum tail voltage $V_{fb\_min}$ with a single threshold voltage (e.g., $V_{LED}$) and provide the resulting signaling to the data/timing control module 128. As another example, the tail feedback module 408 can include a comparator to assert a signal $V_{hi}$ when the voltage $V_{fb\_min}$ exceeds the reference voltage $V_{fb\_hi}$ and another comparator to assert a signal $V_{lo}$ when the voltage $V_{fb\_min}$ falls below the reference voltage $V_{fb\_lo}$. In at least one embodiment, the reference voltages $V_{fb\_lo}$ and the $V_{fb\_hi}$ represent the lower bound and upper bound, respectively, of a specified range for the minimum tail voltage of the LED strings 105-107 during operation. Thus, the tail feedback module 408 acts to signal to the data/timing control 128 when the minimum tail voltage of the LED strings 105-107 has fallen above or below one or more specified ranges so that the data/timing control module 128 can update the code values $C_i$ for the LED strings 105-107 in view of certain transient effects, such as aging and temperature changes.

In an alternate embodiment, rather than implementing the tail feedback module 408, the tail voltages of the LED strings 105-107 can be routed directly to the data/timing control module 128. In this case, the data/timing control module 128 can scan through each activated LED string and compare the corresponding tail voltage to the voltage $V_{LED}$ and adjusts the corresponding code value $C_X$ for the LED string up or down based on this comparison.

The selector 405 includes a plurality of inputs to receive the tail voltages $V_{T1}$, $V_{T2}$, and $V_{Tn}$, an input to receive the signal SEL, and an output to provide a selected one of the tail voltages $V_{T1}$, $V_{T2}$, and $V_{Tn}$ as a voltage $V_{fbs}$ based on the signal SEL. The selector 406 includes an input to receive the voltage $V_{fbs}$, an input to receive the voltage $V_{fb}$ from the voltage divider 127 (FIG. 1), an input to receive the signal CAL, and an output to provide the voltage $V_{fbs}$ as a voltage $V_{fb\_sel}$ when the signal CAL is asserted (indicating calibration mode) and to provide the voltage $V_{fb}$ as the voltage $V_{fb\_sel}$ when the signal CAL is not asserted (indicating operational mode).

The control DAC 124 includes an input configured to receive a control value $C_X$ from the data/timing control module 128 and an output to provide a voltage $V_{DAC}$ having a level based on the input control value $C_X$. The selector 404 includes an input to receive the voltage $V_{DAC}$, an input to receive the voltage $V_{LED}$, an input to receive the signal CAL, and an output to provide the voltage $V_{LED}$ as a voltage $V_{reg}$ when the signal CAL is asserted (indicating calibration mode) and to provide the voltage $V_{DAC}$ as the voltage $V_{reg}$ when the signal CAL is not asserted (indicating operational mode).

As discussed above, the voltage $V_{LED}$ represents the predetermined voltage threshold to which the LED driver 104 attempts to maintain the minimum headroom voltage (i.e., the minimum tail voltage) at or near. As a non-zero tail voltage for a LED string indicates that more power is being used to drive the LED string than is absolutely necessary, it can be advantageous for power consumption purposes for the feedback controller 114 to manipulate the voltage source 112 to adjust the level of the output voltage $V_{OUT}$ until the minimum tail voltage would be approximately zero, thereby eliminating nearly all excess power consumption that can be eliminated without disturbing the proper operation of the LED strings. Accordingly, in one embodiment, the voltage $V_{LED}$ is set at zero volts so as to configure the feedback controller 114 to reduce the level of the output voltage $V_{OUT}$ by an amount expected to cause the minimum tail voltage of the LED strings 105-107 to be at or near zero volts. However, while being advantageous from a power consumption standpoint, having a near-zero tail voltage on a LED string or near-zero headroom voltage for the related current regulator introduces potential problems. As one issue, the current regulators 115-117 may need non-zero headroom voltages to operate properly. Further, it will be appreciated that a near-zero headroom voltage provides little or no margin for spurious increases in the bias voltage needed to drive the LED string resulting from self-heating or other dynamic influences on the LEDs 108 of the LED strings 105-107. Accordingly, in at least one embodiment, the feedback controller 114 can achieve a suitable compromise between reduction of power consumption and the current regulation of the LED driver 104 by setting the voltage $V_{LED}$ at a non-zero voltage, thereby controlling the level of the output voltage $V_{OUT}$ so that the headroom voltages of the related current regulators 115-117 are maintained at or near the non-zero threshold voltage $V_{LED}$ that represents an acceptable compromise between accurate current regulation and reduced power consumption. The threshold voltage $V_{LED}$ can be implemented as, for example, a voltage between 0.1 V and 1 V (e.g., 0.5 V). As discussed above, the LED strings 105-107 can be activated and deactivated independently of each other depending on the PWM data. As each LED string may have a different voltage drop when activated, and as the tail voltage of each LED string is pulled near $V_{OUT}$ when deactivated, the minimum tail voltage of the LED strings 105-107, and thus the minimum headroom voltage of the current regulators 115-117, changes depending at least in part on which LED strings are active and which LED strings are inactive. The techniques described herein facilitate adaptation of the output voltage $V_{OUT}$ in view of the particular LED strings that are activated so as to maintain the headroom voltages of the current regulators 115-117 near a minimum threshold, thereby reducing power consumption in the LED system 100.

The comparator 416 includes an input to receive the voltage $V_{fb}$ from the voltage divider 127 (FIG. 1), an input to receive the voltage $V_{DAC}$ from the control DAC 124, and an output to provide a signal $V_{EQ}$ based on a comparison of the voltage $V_{DAC}$ to the voltage $V_{fb}$, whereby the comparator 416 configures the signal $V_{EQ}$ to a certain state when the voltage $V_{DAC}$ and the voltage $V_{fb}$ are equal. The signal $V_{EQ}$ is input to the data/timing control module 128. The error amplifier 402 includes an input to receive the voltage $V_{reg}$, an input to receive the voltage $V_{fb\_sel}$, and an output to provide the control signal ADJ based on a comparison of the voltage $V_{reg}$ to the voltage $V_{fb\_sel}$.

Figure 5:
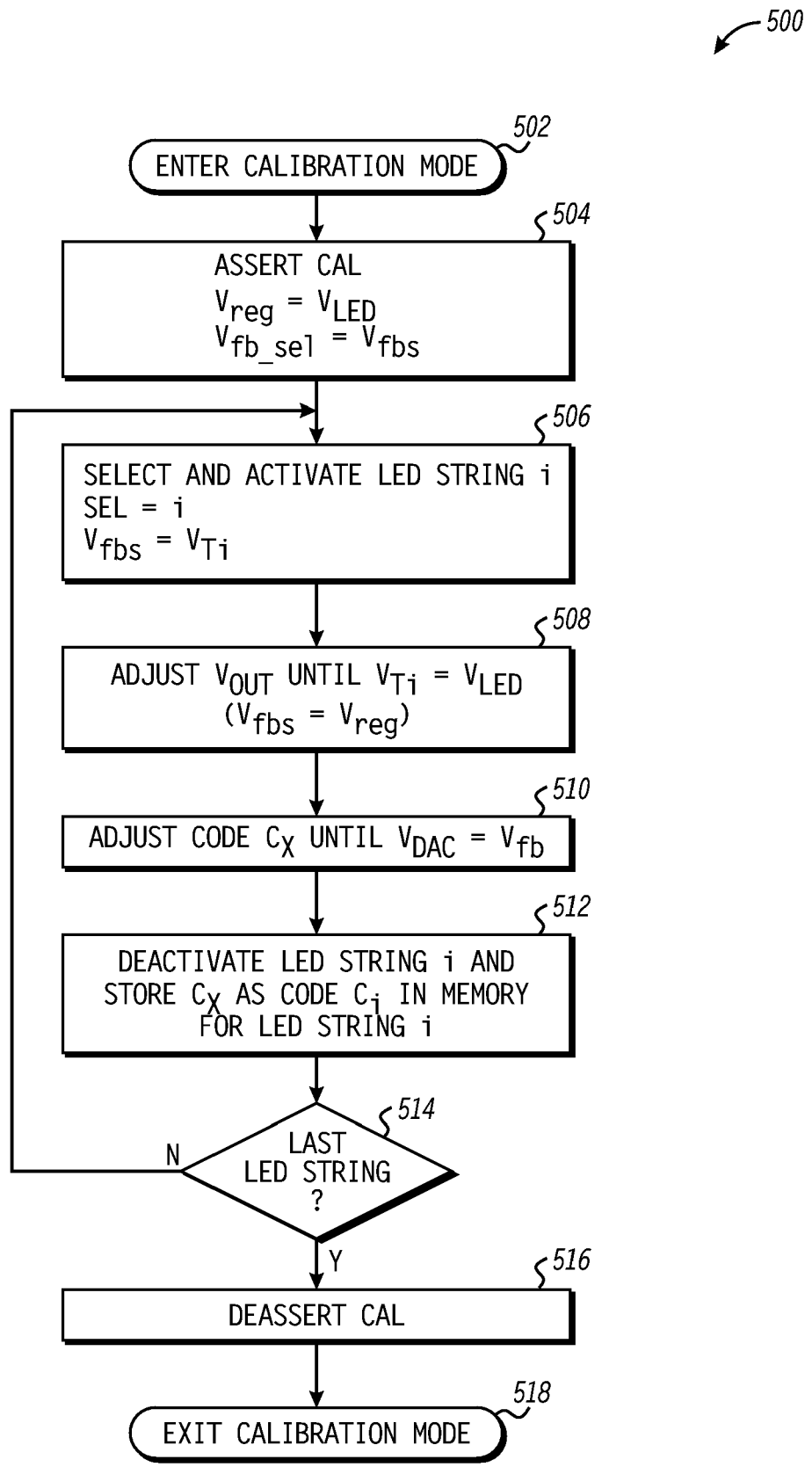
FIG. 5 is a flow diagram illustrating a method of operation of the example implementation of FIG. 4 in a calibration mode in accordance with at least one embodiment of the present disclosure.

FIG. 5 illustrates a method 500 of operation of the implementation of FIG. 4 during the calibration mode in accordance with at least one embodiment of the present disclosure. At block 502 the LED driver 104 enters the calibration mode. In response to entering the calibration mode, at block 504 the data/timing control module 128 asserts the signal CAL. In response to assertion of the signal CAL, the selector 404 provides the reference voltage $V_{LED}$ as the voltage $V_{reg}$ and the selector 406 provides the voltage $V_{fbs}$ output by the selector 405 as the voltage $V_{fb\_sel}$. Further, the assertion of the signal CAL can serve to set the liquid crystal display (LCD) filters of the LED panel 102 to an opaque state so as to block the output of light to the user during the calibration process. At block 506, the data/timing control module 128 selects one of the LED strings 105-107 (as LED string i) by activating, or "turning on," the LED string i and configures the signal SEL so that the selector 405 provides the tail voltage $V_{Ti}$ of the selected LED string as the voltage $V_{fbs}$. As the selector 406 is configured to provide the voltage $V_{fbs}$ as the voltage $V_{fb\_sel}$ and the selector 404 is configured to provide the voltage $V_{LED}$ as the voltage $V_{reg}$, at block 508 the error amplifier 402 configures the control signal ADJ based on a comparison of the voltage $V_{LED}$ to the tail voltage $V_{Ti}$ of the selected LED string so that the level of the voltage $V_{OUT}$ provided by the voltage source 112 (FIG. 1) is adjusted until the tail voltage $V_{Ti}$ of the selected LED string is equal to the voltage $V_{LED}$. With the tail voltage $V_{Ti}$ of the selected LED string being equal to the voltage $V_{LED}$, at block 510 the data/timing control module 128 sets the code value $C_X$ for the control DAC 124 to an initial code value $C_{init}$ and adjusts (e.g., increments or decrements) the code value $C_X$ until the voltage $V_{DAC}$ output by the control DAC 124 is equal to the voltage $V_{fb}$ (as indicated by the comparison performed by the comparator 416). When the voltage $V_{DAC}$ generated from the adjusted code value $C_X$ becomes equal to the voltage $V_{fb}$, at block 512 the data/timing control module 128 provides the adjusted code value $C_X$ for storage in the memory 126 as the calibrated code value $C_i$ for the selected LED string and the selected LED string is deactivated or "turned off."

At block 514 the data/timing control module 128 determines whether it has performed the calibration process of blocks 506-512 for each LED string. If not, the data/timing control module 128 selects the next LED string and repeats the calibration process for the next LED string. Otherwise, if calibration code values have been determined for each LED string, at block 516 the data/timing control module 128 deasserts the signal CAL and at block 518 the LED driver 104 exits the calibration mode and enters the operational mode.

Figure 6:
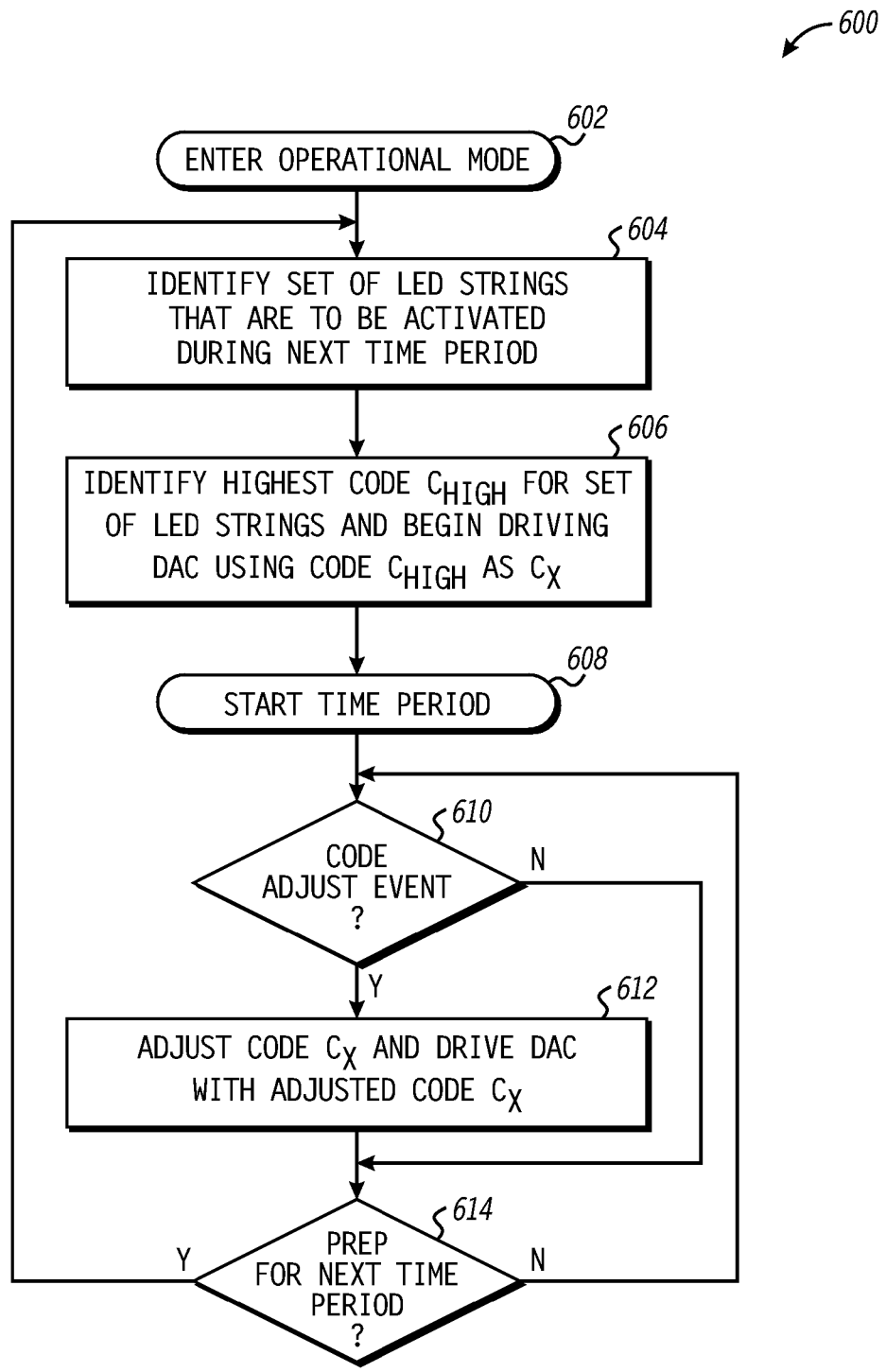
FIG. 6 is a flow diagram illustrating a method of operation of the example implementation of FIG. 3 in an operational mode in accordance with at least one embodiment of the present disclosure.

FIG. 6 illustrates a method 600 of operation of the implementation of FIG. 4 (and the implementation of FIG. 7, discussed below) during the operational mode in accordance with at least one embodiment of the present disclosure. At block 602 the LED driver 104 enters the operational mode. In response to entering the operational mode (controlled by, for example, deassertion of the signal CAL), the implementation of the LED driver 104 of FIG. 4 provides, via the selector 404, the voltage $V_{DAC}$ output by the control DAC 124 as the voltage $V_{reg}$ and provides the voltage $V_{fb}$ from the voltage divider 127 (FIG. 1) as the voltage $V_{fb\_sel}$ via the selector 406.

At block 604, the data/timing control module 128 identifies a set of LED strings that are to be activated at some point during an upcoming time period (e.g., the next PWM cycle or display frame) based on the PWM data. At block 606, the data/timing control module 128 accesses the memory 126 (FIG. 1) to obtain the code values $C_i$ for the LED strings of the set identified at block 604. From this set of one or more code values $C_i$ the data/timing module 128 selects the code value having the highest value, referenced herein as the maximum code value $C_{high}$. In the event that no LED strings are to be enabled during the upcoming time period, the data/timing control module 128 provides the maximum code value $C_{high}$ from a previous iteration of the process of blocks 604 and 606.

Further at block 606, the data/timing control module 128 provides a code value $C_X$ based on the maximum code value $C_{high}$ so as to drive the control DAC 124 to output the voltage $V_{DAC}$ having a magnitude based on the maximum code value $C_{high}$. In one embodiment, the code value $C_X$ (based on the maximum code value $C_{high}$) is provided to the control DAC 124 concurrent with the start of the upcoming time period (block 608). However, in many instances the voltage source 112 requires a non-zero response time to ramp-up the output voltage $V_{OUT}$ to a different level. Thus, if the code value $C_X$ representing a new level for the output voltage $V_{OUT}$ is provided concurrent with the start of the next time period, the feedback mechanism of the control DAC 124, the error amplifier 402, the voltage source 112 (FIG. 1) and the voltage divider 127 (FIG. 1) will not achieve the correct level for the output voltage $V_{OUT}$ until some time after the start of the time period. In this situation, one or more of the LED strings may not be properly enabled while the voltage $V_{OUT}$ is below the indicated level. Accordingly, in one embodiment, the data/timing control module 128 provides the new code value $C_X$ to the control DAC 124 at a determined time prior to the start of the next time period (block 608) so as to allow the boost converter 124 to ramp up to the appropriate level for the output voltage $V_{OUT}$ prior to or concurrent with the start of the next time period so that each and every LED string of the set determined at block 604 can be properly enabled from the start of the time period. However, initiating the ramp-up of the output voltage $V_{OUT}$ too early before the start of the next time period can result in unnecessary power consumption, so the data/timing control module 128 attempts to time the initiation so that the new level for the voltage $V_{OUT}$ is achieved at or just before the start of the next time period. To avoid over-current at the voltage source 112, rather than rapidly jumping to the new code value $C_X$, the data/timing control module 128 gradually increments the code value $C_X$ until the identified new code value $C_X$ is reached.

The code value $C_X$ provided to the control DAC 124 for the next time period can be equal to the maximum code value $C_{high}$ determined at block 606 (i.e., $C_X=C_{high}$) or the code value $C_X$ can be set to the maximum code value $C_{high}$ adjusted by an offset (e.g., $C_X=C_{high}+$offset), where the offset can compensate for temperature transients, aging effects, the response time of the voltage source 112, and the like. In one embodiment, the adjustment by the offset can last a fraction or all of the time period. To illustrate, the data/timing control module 128 can add a fixed offset to every code $C_{high}$ provided to the control DAC 124 for each time period and as the system 100 ages, the offset is changed to compensate for aging effects. Alternately, the adjustment by the offset can be temporary. To illustrate, the switching off and on of the LEDs 108 can introduce a transient thermal effect and the data/timing control module 128 can compensate for this transient thermal effect by temporarily adding an offset to the maximum code value $C_{high}$ prior to or upon the start of the time period and then removing the offset at a certain point after the start of the time period to save power. This temporary offset also can be added, for example, to increase the rate at which the voltage source 112 reaches the desired level for the voltage $V_{OUT}$. In another embodiment, the offset can be applied for the entire time period.

At block 610, the data/timing control module 128 determines whether an event that necessitates an adjustment to the code $C_X$ being provided to the control DAC 124. If an event has occurred, at block 612 the data/timing control module 128 can adjust the code value $C_X$ based on a corresponding offset and drive the control DAC 124 with the adjusted code value $C_X$. Such an event can include, for example, the minimum tail voltage of the LED strings 105-107 (as indicated by the voltage $V_{fb\_min}$ output by the tail feedback module 408) exceeding a threshold (e.g., falling above an upper threshold or falling below a lower threshold). In response, the data/timing control module 128 can increase or decrease the code $C_X$ by an offset, thereby adjusting the resulting voltage $V_{DAC}$, which in turn causes a corresponding change in the output voltage $V_{OUT}$ of the voltage source 112 through the feedback mechanism. As discussed above, the offset can be applied for the entire time period (e.g., during an entire PWM cycle), or only during a portion of the time period (e.g., during the first Z clock cycles of a PWM cycle).

As an example, the temperature data could indicate that the ambient temperature of the LED panel 102 has increased above a predetermined threshold, thereby triggering at block 612 the data/timing control module 128 to adjust the code $C_X$ by an offset3 (e.g., $C_X=C_X+$offset3 or $C_X=$offset3$*C_X$, whereby offset3 is a constant) so as to compensate for the changed voltage drop of the LED strings due to their changed temperature.

As another example, the value of the applied offset can be determined through a relationship between the gain of the control DAC 124 and the resistances of the voltage divider 127 (FIG. 1). In an implementation whereby the tail feedback module 408 (FIG. 4) implements an ADC to generate a code value $C_{fb\_min}$ representative of the minimum tail voltage $V_{fb\_min}$, the offset can be determined in accordance with the equation:

$$\text{offset} = \frac{R_{f2}}{R_{f1}+R_{f2}} \times \frac{(C_{thresh}-C_{fb\_min})}{\text{Gain\_ADC}\times\text{Gain\_DAC}} \qquad \text{EQ. 1}$$

whereby $R_{f1}$ and $R_{f2}$ represent the resistances of the resistor 128 and the resistor 130, respectively, of the voltage divider 127, $C_{thresh}$ represents the threshold code value used by the data/timing control module 128 to determine whether the headroom voltage represented by the minimum tail voltage $V_{fb\_min}$ has fallen below a predetermined threshold, Gain_ADC represents the gain of the ADC (in units code per volt) of the LED driver used to generate the code $C_{fb\_min}$, and Gain_DAC represents the gain of the control DAC (in unit of volts per code). A similar relationship can be utilized to determine the offset based on the analog voltages $V_{fb\_min}$ and $V_{thresh}$.

At block 614, the data/timing control module 128 determines whether to begin the process of blocks 604-612 for the next time period. If the current time period is still being processed, flow returns back to block 610. Otherwise, flow returns to block 604, whereby the process of determining the code value $C_X$ and driving the control DAC 124 based on the code value $C_X$ is repeated for the next time period.

As illustrated by method 600, the LED driver 104 can utilize the code values $C_i$ determined during the calibration mode to drive the operation of the voltage source 112 during the operational mode so that the output voltage $V_{OUT}$ is not significantly higher than is necessarily to properly drive each of the LED strings that are to be activated during some point of the corresponding time period. By maintaining the output voltage $V_{OUT}$ at or near this LED string-dependent minimum voltage level, the power consumption of the LED driver 104 and the LED panel 102 can be reduced while facilitating proper operation of the LED panel 102.

Figure 7:
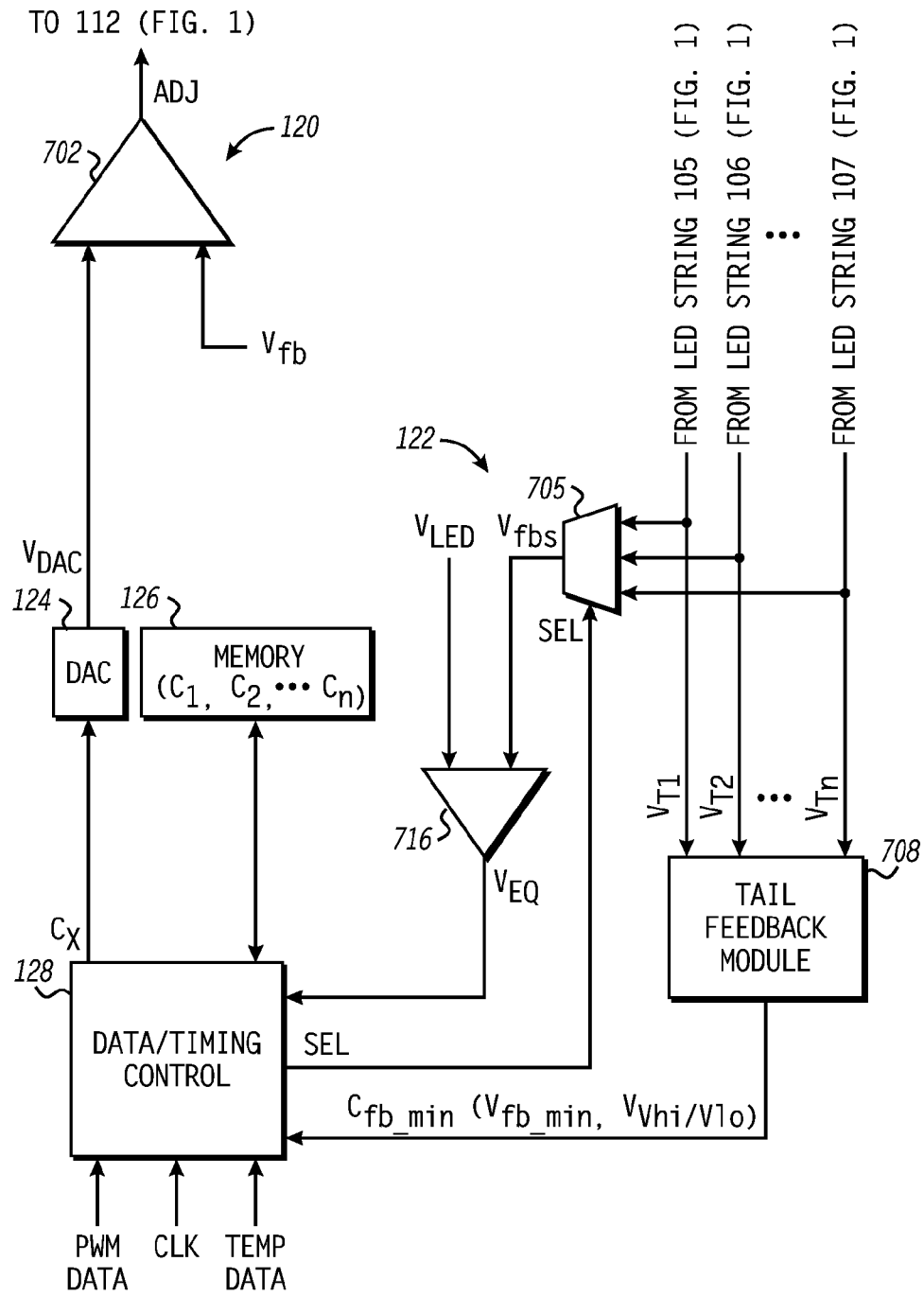
FIG. 7 is a diagram illustrating an example implementation of a feedback controller of the LED system of FIG. 1 in accordance with at least one embodiment of the present disclosure.

FIG. 7 illustrates another example implementation of the feedback controller 114 of FIG. 1 in accordance with at least one embodiment of the present disclosure. In the depicted example, the boost control module 120 is implemented using an error amplifier 702 and the calibration module 122 is implemented using a selector 705, a tail feedback module 708, and a comparator 716. The data/timing control module 128 is configured to provide a plurality of control signals based on one or more of the PWM data, timing information (e.g., from a clock signal CLK), and temperature data from a temperature sensor (not shown) that is co-located with the LED panel 102 (FIG. 1). The control signals include a signal SEL used to select a particular LED string for calibration during the calibration mode, as described below.

The tail feedback module 708 includes a plurality of inputs to receive the tail voltages (or headroom voltages) $V_{T1}$, $V_{T2}$, and $V_{Tn}$ and an output to provide feedback signaling based on the tail voltages $V_{T1}$, $V_{T2}$, and $V_{Tn}$ as similarly discussed above with respect to the tail feedback module 408 of FIG. 4. The selector 705 includes a plurality of inputs to receive the tail voltages $V_{T1}$, $V_{T2}$, and $V_{Tn}$, an input to receive the signal SEL, and an output to provide a selected one of the tail voltages $V_{T1}$, $V_{T2}$, and $V_{Tn}$ as a voltage $V_{fbs}$ based on the signal SEL. In an alternate embodiment, rather than implementing the tail feedback module 708, the tail voltages of the LED strings 105-107 can be routed directly to the data/timing control module 128. In this case, the data/timing control module 128 can scan through each activated LED string and compare the corresponding tail voltage to the voltage $V_{LED}$ and adjusts the corresponding code value $C_X$ for the LED string up or down based on this comparison.

As described above, the control DAC 124 includes an input configured to receive a control value $C_X$ from the data/timing control module 128 and an output to provide a voltage $V_{DAC}$ having a level based on the input control value $C_X$. The error amplifier 702 includes an input to receive the voltage $V_{fb}$ from the voltage divider 127 (FIG. 1), an input to receive the voltage $V_{DAC}$, and an output to provide the control signal ADJ based on a comparison of the voltage $V_{fb}$ to the voltage $V_{DAC}$.

The comparator 716 includes an input to receive the voltage $V_{fbs}$ output by the selector 705, the voltage $V_{LED}$, and an output to provide a signal $V_{EQ}$ based on a comparison of the voltage $V_{fbs}$ to the voltage $V_{LED}$, whereby the comparator 716 configures the signal $V_{EQ}$ to a certain state when the voltage $V_{fbs}$ and the voltage $V_{LED}$ are equal. The signal $V_{EQ}$ is input to the data/timing control module 128 for calibration purposes. As discussed above, the voltage $V_{LED}$ represents the predetermined voltage threshold near which the LED driver 104 attempts to maintain the minimum headroom voltage (i.e., the minimum tail voltage) so as to reducing power consumption in the LED system 100.

Figure 8:
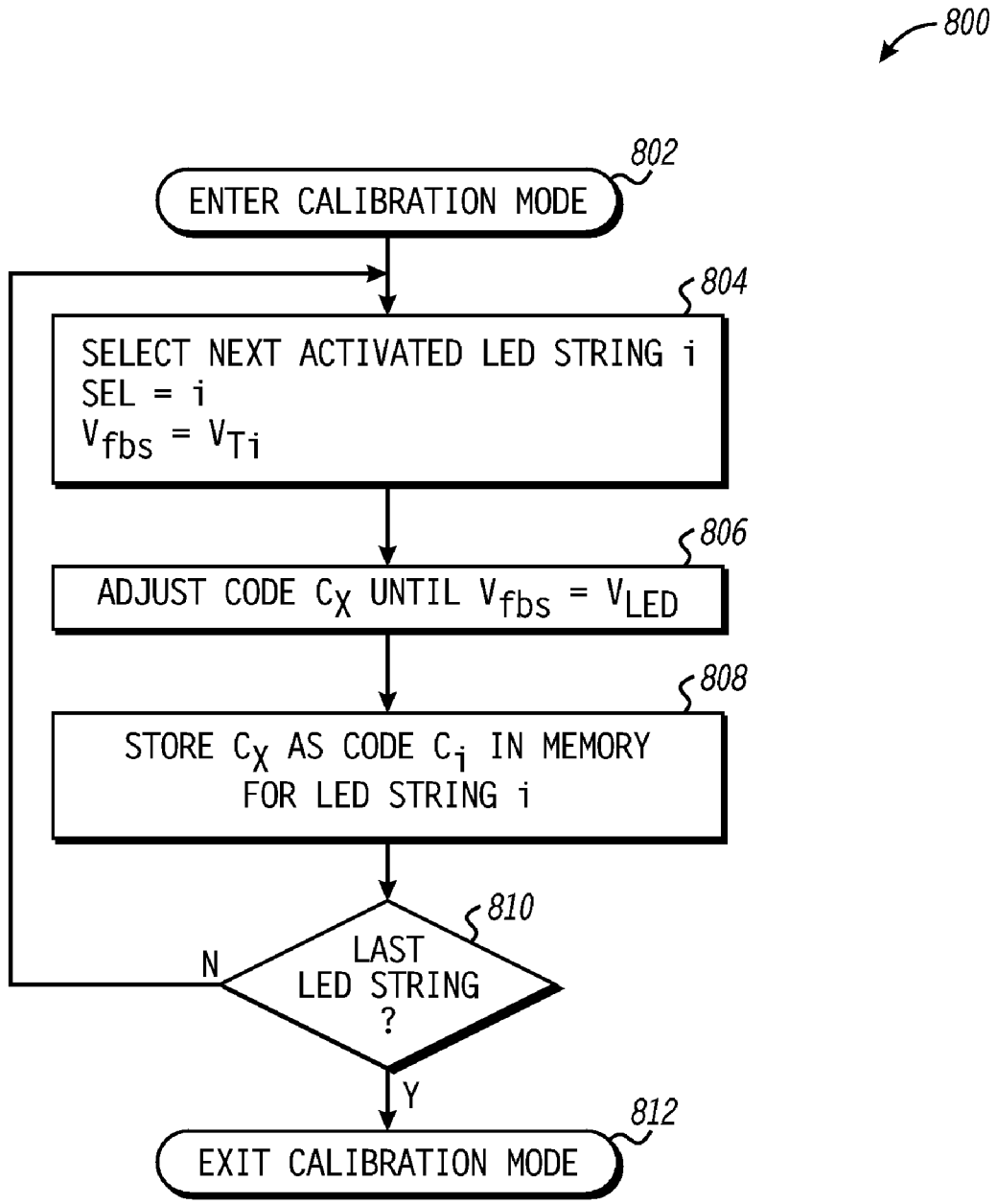
FIG. 8 is a flow diagram illustrating a method of operation of the example implementation of FIG. 7 in a calibration mode in accordance with at least one embodiment of the present disclosure.
Figure 9:
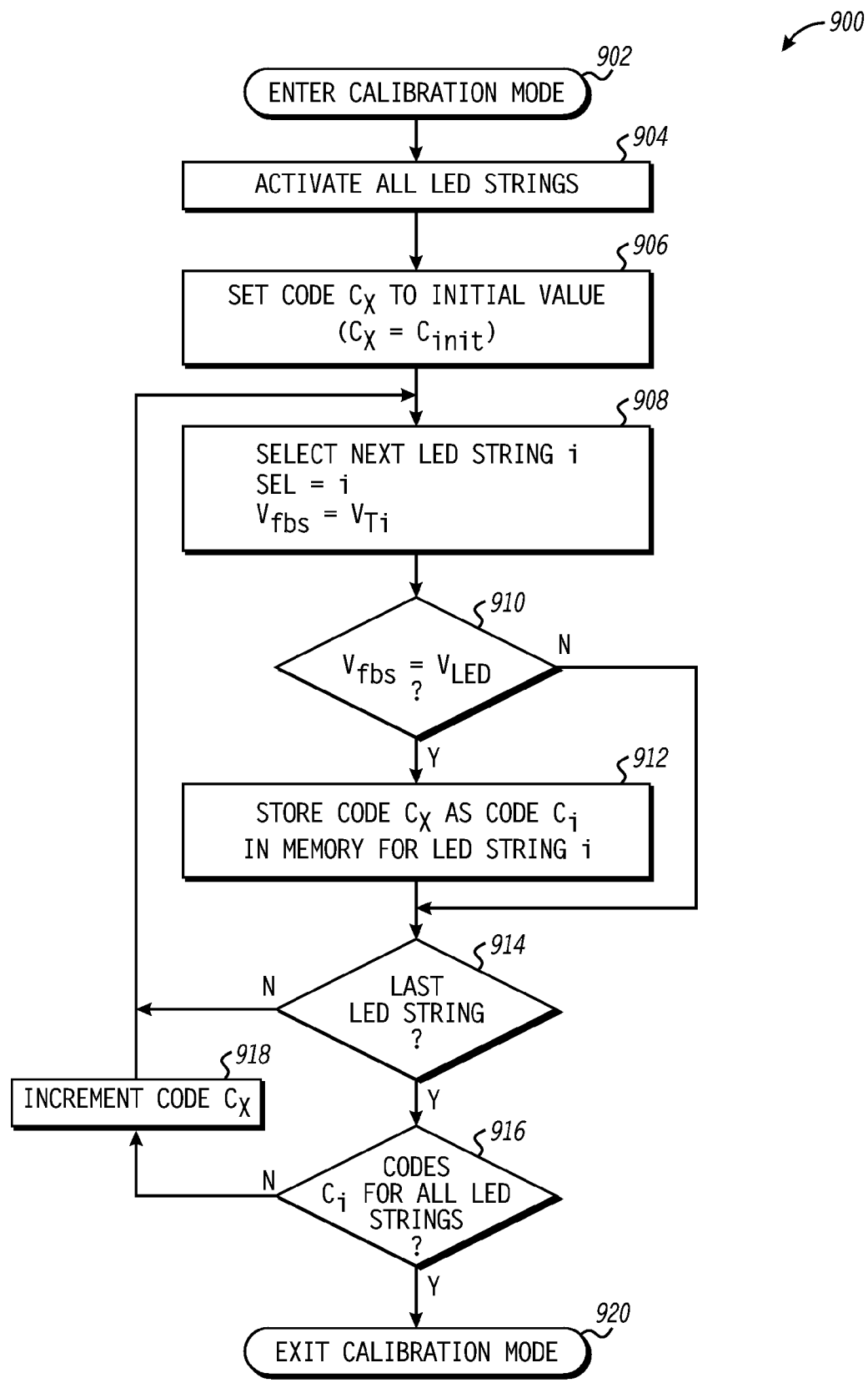
FIG. 9 is a flow diagram illustrating another method of operation of the example implementation of FIG. 7 in a calibration mode in accordance with at least one embodiment of the present disclosure.

FIGS. 8 and 9 illustrate example methods of operation of the implementation of FIG. 7 for a calibration mode either prior to an operational mode, or in parallel with (or as part of) an operational mode in accordance with at least one embodiment of the present disclosure. Method 800 of FIG. 8 illustrates an example calibration technique whereby the code value $C_i$ for each LED string is separately determined by selecting a particular LED string and then adjusting the code $C_X$ until the resulting tail voltage (headroom voltage) of the selected LED string is at or near the threshold voltage $V_{LED}$. At block 802 the LED driver 104 enters the calibration mode. For this example, the calibration can be performed while actively driving the LED panel 102 with video content by performing the calibration process for an LED string when the LED string is otherwise activated for operational display purposes. Thus, the LED panel 102 operates as it typically would during a normal operational mode and the calibration mode can run concurrently for any part (or the entirety) of the operational mode. Accordingly, at block 804, the data/timing control module 128 analyzes the received PWM data to select one of the LED strings 105-107 (as LED string i) that is to be activated based on the PWM data and configures the signal SEL so that the selector 705 provides the tail voltage $V_{Ti}$ of the selected LED string i as the voltage $V_{fbs}$. At block 806 the data/timing control module 128 sets the code value $C_X$ for the control DAC 124 to an initial code value $C_{init}$ and adjusts (e.g., increments or decrements) the code value $C_X$ (hereby adjusting the voltage $V_{DAC}$ and thus adjusting the tail voltage $V_{Ti}$ via the resulting change in the voltage $V_{OUT}$) until the voltage $V_{fbs}$ (i.e., $V_{Ti}$) is equal to the voltage $V_{LED}$ (as indicated by the comparison performed by the comparator 716). When the voltage $V_{fbs}$ resulting from the adjusted code value $C_X$ becomes equal to the voltage $V_{LED}$, at block 808 the data/timing control module 128 provides the adjusted code value $C_X$ for storage in the memory 126 as the calibrated code value $C_i$ for the selected LED string. At block 810 the data/timing control module 128 determines whether it has performed the calibration process of blocks 804-808 for each LED string. If not, the data/timing control module 128 selects the next LED string and repeats the calibration process for the next LED string. Otherwise, if calibration code values have been determined for each LED string, at block 812 the LED driver 104 exits the calibration mode and returns to the operational mode without calibration.

Method 900 of FIG. 9 illustrates an example calibration technique whereby the code values $C_i$ for all LED strings are determined in parallel by incrementally adjusting the code $C_X$, sweeping through each of the LED strings after each increment of the code $C_X$ to determine whether the tail voltage of the corresponding LED string is at or near the voltage $V_{LED}$, and storing the code value $C_X$ as the code value $C_i$ for each of those LED strings meeting this condition. At block 902 the LED driver 104 enters the calibration mode. At block 904, the data/timing control module 128 activates all of the LED strings and at block 906 the data/timing control module 128 sets the code value $C_X$ for the control DAC 124 to an initial code value $C_{init}$.

At block 908, the data/timing control module 128 selects one of the LED strings 105-107 (as LED string i) and configures the signal SEL so that the selector 705 provides the tail voltage $V_{Ti}$ of the selected LED string as the voltage $V_{fbs}$. At block 910, the data/timing control module 128 analyzes the output of the comparator 716 to determine whether the tail voltage $V_{Ti}$ of the selected LED string (as voltage $V_{fbs}$) is equal to the voltage $V_{LED}$. If equal, at block 912 the data/timing control module 128 provides the code value $C_X$ for storage in the memory 126 as the calibrated code value $C_i$ for the selected LED string. The selected LED string then can be deactivated or "turned off" for the remainder of the calibration process to conserve power. If the comparator 716 indicates the voltages are not equal, the method 900 bypasses the storage process of block 912 and continues to block 914. At block 914 the data/timing control module 128 determines whether each LED string has been analyzed for the current code value $C_X$. If not, the data/timing control module 128 selects the next LED string and the process of blocks 908-914 is repeated for the next LED string.

Once all LED strings have been analyzed for the current code value $C_X$, at block 916 the data/timing control module 128 determines whether a code value $C_i$ has been determined and stored for each LED string. If not, at block 918 the data/timing control module 128 increments (or alternately decrements) the code value $C_X$ and the remaining LED strings are analyzed for this new value for the code value $C_X$ by repeating the processes of blocks 908-918 with the new value for the code value $C_X$ in place. Once a code value $C_i$ has been determined for each LED string, at block 920 the LED driver 104 exits the calibration mode and enters the operational mode.

Figure 10:
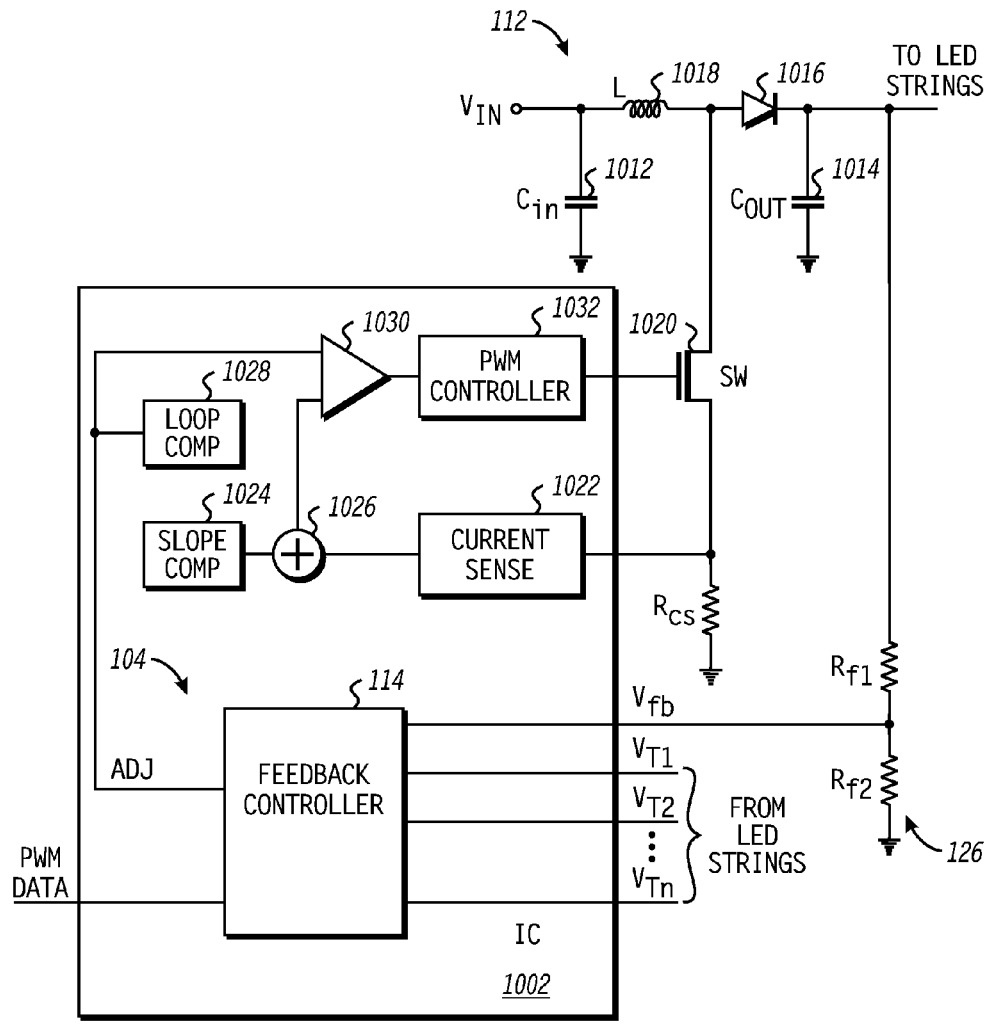
FIG. 10 is a diagram illustrating an integrated circuit (IC)-based implementation of the LED system of FIG. 1 in accordance with at least one embodiment of the present disclosure.

FIG. 10 illustrates an integrated circuit (IC)-based implementation of the LED system 100 of FIG. 1 as well as an example implementation of the voltage source 112 as a boost converter in accordance with at least one embodiment of the present disclosure. In the depicted example, the LED driver 104 is implemented as IC 1002 having the feedback controller 114. As also illustrated, some or all of the components of the voltage source 112 can be implemented at the IC 1002. In one embodiment, the voltage source 112 can be implemented as a step-up boost converter, a step-down buck converter, a buck-boost converter, and the like. To illustrate, the voltage source 112 can be implemented with an input capacitor 1012, an output capacitor 1014, a diode 1016, an inductor 1018, a switch 1020, a current sense block 1022, a slope compensator 1024, an adder 1026, a loop compensator 1028, a comparator 1030, and a PWM controller 1032 connected and configured as illustrated in FIG. 10.

The term "set," as used herein, is defined as one or more of a larger set, inclusive. The terms "including", "having", or any variation thereof, as used herein, are defined as comprising. The term "coupled", as used herein with reference to electro-optical technology, is defined as connected, although not necessarily directly, and not necessarily mechanically. The term "exceed," as used herein, is defined as falling below a value representing a lower threshold or falling above a value representing an upper threshold.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
providing a voltage source configured to provide an adjustable output voltage to a head end of each of a plurality of light emitting diode (LED) strings;
providing a LED driver configured to control the voltage source;
operating the LED driver in a calibration mode to determine a plurality of code values, each code value associated with a corresponding LED string of the plurality of LED strings, and each code value representing a level of the output voltage that results in a tail voltage of the LED string that is equal to a predetermined voltage; and
operating the LED driver in an operational mode to control the voltage source during at least a portion of a select duration based on the plurality of code values.

2. The method of claim 1, wherein operating the LED driver in the operational mode comprises:
determining, from the plurality of LED strings, a set of one or more LED strings to be activated during a select duration;
selecting a first code value from the plurality of code values, the first code value comprising the maximum code value associated with the set of LED strings; and
controlling the voltage source to provide the output voltage based on the first code value.

3. The method of claim 1, further comprising:
adjusting the first code value responsive to an event to generate a second code value; and
wherein controlling the voltage source to provide the output voltage based on the first code value comprises controlling the voltage source based on the second code value.

4. The method of claim 3, wherein:
the event comprises one of: a minimum tail voltage of the set of LED strings exceeding
the predetermined voltage or an ambient temperature associated with the set of LED strings exceeding a predetermined temperature threshold during the select duration; and
adjusting the first code value comprises adjusting the first code value by an offset to generate the second code value.

5. The method of claim 1, further comprising:
temporarily adjusting the first code value by an offset prior to or upon a start of the select duration; and
readjusting the first code value to remove the offset prior to or upon an end of the select duration.

6. The method of claim 1, wherein the LED driver is operated in the operational mode and the calibration mode concurrently.

7. A method comprising:
determining a set of light emitting diode (LED) strings that are to be activated during a select duration;
select a first code value from a set of code values associated with the set of LED strings, the first code value comprising the maximum code value of the set of code values;
generating a first voltage based on the first code value; and
adjusting a level of an output voltage provided to a head end of each LED string of the set of LED strings for the select duration based on the first voltage.

8. The method of claim 7, further comprising:
for each LED string of the set of LED strings:
determining a corresponding code value of the set of code values based on a tail voltage of the LED string; and
storing the corresponding code value in a memory.

9. The method of claim 8, wherein determining the corresponding code value of the set of code values based on the tail voltage of the LED string comprises:
adjusting the level of the output voltage until the tail voltage of the LED string is equal to a predetermined voltage; and
determining the corresponding code value based on the adjusted level of the output voltage responsive to the tail voltage of the LED string being equal to the predetermined voltage.

10. The method of claim 8, wherein determining the corresponding code value based on the adjusted level of the output voltage comprises:
determining a second voltage proportional to the adjusted level of the output voltage;

adjusting a code value until a voltage generated based on the adjusted code value is equal to the second voltage; and determining the adjusted code value as the corresponding code value responsive to the second voltage being equal to the voltage generated based on the adjusted code value being equal to the second voltage.

11. The method of claim 8, wherein determining the corresponding code value of the set of code values based on the tail voltage of the LED string comprises:

adjusting the level of the output voltage; and determining the corresponding code value based on the adjusted level of the output voltage responsive to the tail voltage of the LED string being equal to the predetermined voltage.

12. A system comprising:

a voltage source configured to provide an adjustable output voltage to a head end of each of a plurality of light emitting diode (LED) strings; and a LED driver comprising:

a plurality of inputs, each input configured to couple to a tail end of a corresponding one of the plurality of LED strings; and a feedback controller coupled to the plurality of inputs and configured to:

determine, from the plurality of LED strings, a set of LED strings that are to be activated during a select duration;

select a first code value from a set of code values associated with the set of LED strings, the first code value comprising the maximum code value of the set of code values;

generate a first voltage based on the first code value; and control the voltage source so as to adjust a level of the output voltage for a select duration based on the first voltage.

13. The system of claim 12, the feedback controller further comprising a memory and further configured to:

for each LED string of the plurality of LED strings:

determine a corresponding code value for the LED string based on a tail voltage of the LED string; and store the corresponding code value in the memory.

14. The system of claim 12, wherein the feedback controller is configured to determine the corresponding code value based on the tail voltage of the LED string by:

controlling the voltage source to adjust the level of the output voltage until the tail voltage of the LED string is equal to a predetermined voltage; and determining the corresponding code value based on the adjusted level of the output voltage responsive to the tail voltage of the LED string being equal to the predetermined voltage.

15. The system of claim 12, wherein the feedback controller is configured to determine the corresponding code value based on the adjusted level of the output voltage by:

adjusting a code value until a voltage generated based on the adjusted code value is equal to a second voltage that is proportional to the adjusted level of the output voltage; and determining the adjusted code value as the corresponding code value responsive to the voltage generated based on the adjusted code value being equal to the second voltage.

16. The system of claim 12, wherein the feedback controller is configured to control the voltage source to adjust the output voltage by:

controlling the voltage source to adjust the output voltage based on a comparison of the first voltage to a second voltage that is proportional to the output voltage.

17. The system of claim 12, wherein:

the voltage source comprises an input to receive a control signal; and the feedback controller comprises:

a memory configured to store the set of code values;

a digital-to-analog converter (DAC) comprising an input to receive a second code value and an output to provide a voltage based on the second code value; and an error amplifier comprising a first input coupled to the output of the DAC in an operational mode, a second input configured to receive a second voltage that is proportional to the output voltage of the voltage source in the operational mode, and an output configured to provide the control signal.

18. The system of claim 17, further comprising:

a data/timing control module configured to access, in the operational mode, the first code value from the memory and to provide the first code value as the second code value to the DAC.

19. The system of claim 18, further comprising:

a comparator comprising a first input configured to receive the second voltage, a second input coupled to the output of the DAC, and an output to configure an output signal into a select state responsive to the second voltage being equal to a voltage output by the DAC; and wherein:

the error amplifier comprises the first input configured to receive a reference voltage in a calibration mode, the second input configured to receive a tail voltage of a LED string being calibrated in the calibration mode, and the output configured to provide the control signal;

the data/timing control module is further configured to:

adjust a code value provided as the second code value to the DAC until the output signal of the comparator is configured into the select state; and store the adjusted code value in the memory as a code value associated with the LED string.

20. The system of claim 12, wherein:

the voltage source comprises an input to receive a control signal; and the feedback controller comprises:

a memory configured to store the set of code values;

a digital-to-analog converter (DAC) comprising an input to receive a second code value and an output to provide a voltage based on the second code value; and an error amplifier comprising a first input coupled to the output of the DAC, a second input to receive a second voltage that is proportional to the output voltage of the voltage source, and an output configured to provide the control signal; and the system further comprising:

a comparator comprising a first input configured to receive a predetermined threshold voltage, a second input configured to receive a tail voltage of a select LED string of the plurality of the LED strings, and an output to configure an output signal into a select state responsive to the second voltage being equal to the predetermined threshold voltage; and a data/timing control module configured to:

adjust a code value provided as the second code value to the DAC until the output signal of the comparator is configured into the select state; and store the adjusted code value in the memory as a code value associated with the LED string.

* * * * *